June 26, 1962

C. W. CHAPMAN
VARIABLE SPEED POWER TRANSMISSIONS 3,040,589

Filed Jan. 19, 1959

Inventor
Charles Wallace Chapman
By
Hooper, Leonard & Buell
his Attorneys

Inventor
Charles Wallace Chapman
By
Hooper, Leonard & Buell
his Attorneys

United States Patent Office 3,040,589
Patented June 26, 1962

3,040,589
VARIABLE SPEED POWER TRANSMISSIONS
Charles Wallace Chapman, Burstow, Horley, England, assignor, by mesne assignments, to F. Perkins Limited, London, England
Filed Jan. 19, 1959, Ser. No. 787,468
Claims priority, application Great Britain Jan. 24, 1958
9 Claims. (Cl. 74—15.84)

This invention relates to variable speed power transmissions particularly for use with land vehicles driven by internal combustion engines and has for an object to provide a simple form of transmission in which the gear ratio is infinitely variable over a predetermined range and in which the output torque available for the final drive to the vehicle e.g. to the land wheels or endless tracks increases as the speed of the vehicle diminishes and is a maximum when the vehicle is stalled.

An internal combustion engine, for example a diesel engine, may have a useful operating speed range from say 900 r.p.m. to say 3,600 r.p.m. Usually the torque of such an engine is substantially constant over that range, falling somewhat at the higher speeds. This torque can be increased by supercharging the engine, but normal methods of supercharging tend to increase the torque which is generated by the engine by only a small amount at the lower speeds and by a greater amount at the higher speed, whereas, with any vehicle it is desirable that the engine torque should rise rapidly as its speed falls.

If an engine be supercharged by a supercharger which runs at substantially constant speed and so delivers a substantially constant weight of gas irrespective of the speed of the engine, and if the weight of gas were sufficient to charge the cylinders at atmospheric pressure at maximum speed, then in the case of the engine quoted above, it would receive roughly three times the weight of air per cycle at 1200 r.p.m. as it would at its maximum speed of 3,600 r.p.m. and its torque at 1200 r.p.m. would be approximately three times its torque at 3,600 r.p.m. and and three times its normal torque. If the engine were now connected to the final drive via an automatic torque increasing device, such as an hydraulic torque converter which gave, say, a 2½ to 1 torque multiplication when the output shaft of the converter were stalled, or held stationary, and if under these conditions the converter were of a capacity which held the engine down to its lower operating speed, then the output shaft of the converter when stalled would have on it a torque approximately 7½ times the normal engine torque.

The present invention is based upon these general considerations.

According to this invention a variable speed power transmission comprises a torque converter, the input shaft of which is arranged to be driven from a prime mover and the output shaft of which is arranged for connection with a mechanism to be driven and a booster for the prime mover which is arranged to be driven through a differential gear from the input and output shafts of the torque converter so that the effect of a decrease in speed of the output shaft of the torque converter (when transmitting large put torques) on the speed of the booster is substantially balanced by the consequent increased speed of the input shaft of the torque converter relatively to its output shaft. Preferably the differential gear is in the form of an epicyclic gear, the three basic elements of which are connected respectively to the input and output shafts of the torque converter and to the booster.

As previously indicated the invention is particularly applicable where the prime mover is an internal combustion engine, and the booster comprises a supercharger for the engine. Under these conditions the epicyclic gear may comprise a planet wheel carrier which is driven from the input shaft of the torque converter or part rotating therewith and the planet wheels are arranged to engage two toothed tracks for example a sun wheel and a concentrically arranged internally toothed ring, the latter of which is driven by the output shaft of the torque converter and the former of which drives the supercharger.

The internal combustion engine may be of any type, e.g. a 2-stroke, or 4-stroke petrol or diesel engine and the torque converter may be of any type where the torque of the output shaft is greater than that of the input shaft when the speed of the input shaft exceeds that of the output shaft. It may, for example, be a hydro-kinetic, a hydro-static, a pneumatic or electro-magnetic device. The supercharger may be any type such as Roote's blower, or a centrifugal blower. It may, if desired be an exhaust turbo-blower.

The characteristics of the torque converter and supercharger are preferably so matched with those of the engine, that, if the output shaft of the converter be locked and the engine be given "full throttle," the engine cannot exceed some selected speed, for example 1200 r.p.m., in its lower speed range and the supercharger cannot thus be over-speeded.

The following is a description of a variable speed power transmission suitable for use with a supercharged internal combustion engine driving a vehicle reference being made to the accompanying drawing in which.

Like reference numerals refer to like parts in the various figures of the drawings.

Figure 1A:
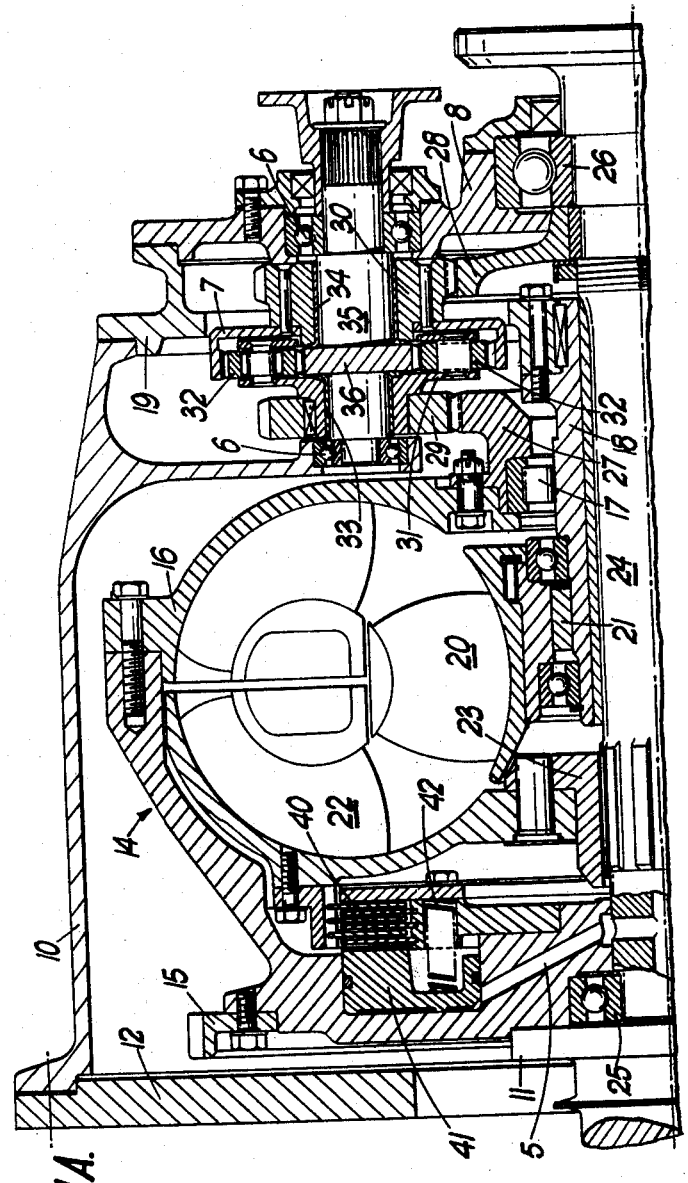
FIGURES 1A and 1B are vertical cross-sections through a torque converter and associated gearing for driving the supercharger and oil pump, respectively.

A stationary casing 10 is fixed to a plate 12 secured to the rear of the engine casing (not shown).

The rear or driving end of the crankshaft of the engine is indicated at 13.

The outer casing 14 of a torque converter of the Fottinger type which acts as the engine flywheel, carries the starter ring 15 and the pumping unit 16 of the converter. It is bolted at the forward end to the engine crankshaft flange 11 and is supported at the rear by a roller bearing 17 carried on a hollow stationary stub shaft member 19 spigoted into and secured to an intermediate end plate 19 bolted to the casing 10.

The reaction stator 20 of the converter is supported on stub shaft member 18 by ball bearings 9 and provided with a uni-directional brake 21 in the accepted manner.

The turbine runner 22 of the converter is carried by a support 23 splined to the output shaft 24 which is supported by the pilot bearing 25 in the outer casing 14 and the bearing 26 in the rear cover 8 of casing 10, and which output shaft drives the road wheels of a vehicle through a simple forward and reverse gear box and conventional propeller shaft and differential gear, but a clutch need not be provided.

A gearwheel 27 is bolted to and driven by pumping unit 16 of the converter and is thus driven directly by the engine.

A corresponding gear 28 is fixed to and driven by turbine runner 22 through the output shaft 24.

A gear 29 is driven by the gear wheel 27 and connected to the planet carrier 31 of an epicyclic gear in which are mounted any desired number of planet wheels 32. A gear 30 is driven by the gear 28 and is connected to so as to drive the ring gear 7 which surrounds and meshes with the planet wheels 32. The gears 29 and 30 are supported by plain bearings 33, 34, on a shaft 35 which is in turn supported in bearings 6 from casing 10 and the rear cover 8. The shaft 35 has formed on it a flange having teeth 36 which flange acts as a sun-wheel meshing with planet wheels 32. The shaft 35 is arranged to drive directly or through gears, chain, belt or the like, a supercharger (not shown) which may be a turbo-blower and which feeds the engine with combustion air.

The gear 27 is also arranged to drive via the gear 37 an oil pump unit. This is preferably a double unit comprising a feed pump 39 to supply oil under pressure to the converter and for lubrication purposes and a scavenge pump 38 for removing drained oil from the sump 43 and passing it to an external tank, filters, and cooler (not shown).

If desired means may be provided for locking together the input (pump) and output (turbine) sides of the converter so as to provide a solid non-slip drive from engine to output.

A possible means is indicated at 40 where alternate plates of a multi-plate clutch are splined respectively to members secured to input casing 14 and output turbine 22. These plates can be pressed together by the oil operated annular piston 41 disposed in an annular cylinder formed in the casing 14 and which piston is normally held away from the plates by springs 42.

Figure 2:
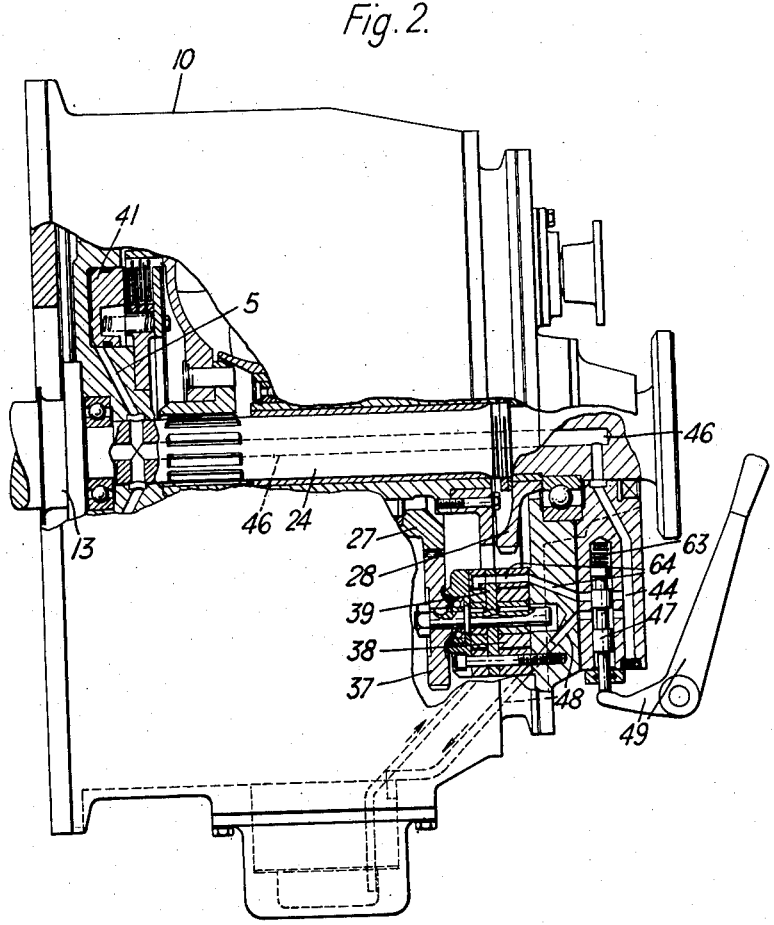
FIGURE 2 shows a hand operated valve for controlling the flow of liquid to the clutch associated with the torque converter.

Passages 5 are provided for supplying oil to the cylinder from the pump 39 through a conduit 44 (see FIGURE 2) to a circumferential channel 45 surrounding the shaft 24 which latter is formed with an axial passage 46 leading to the passages 5. A control valve 47 is inserted between the outlet 64 from the pump and the conduit 44 leading to the channel 45 so as to determine when oil is to be admitted to engage the clutch 40 or to release the oil to free the clutch. The valve is shown in FIGURE 2 in a position in which the clutch is free and in which it places the passage 44 in communication with a passage 48 leading to the oil sump of the converter. The control valve is shown in FIGURE 2 as being manually controlled by a pivoted lever 49, a return spring 63 being provided for returning the valve member 47.

Figure 3:
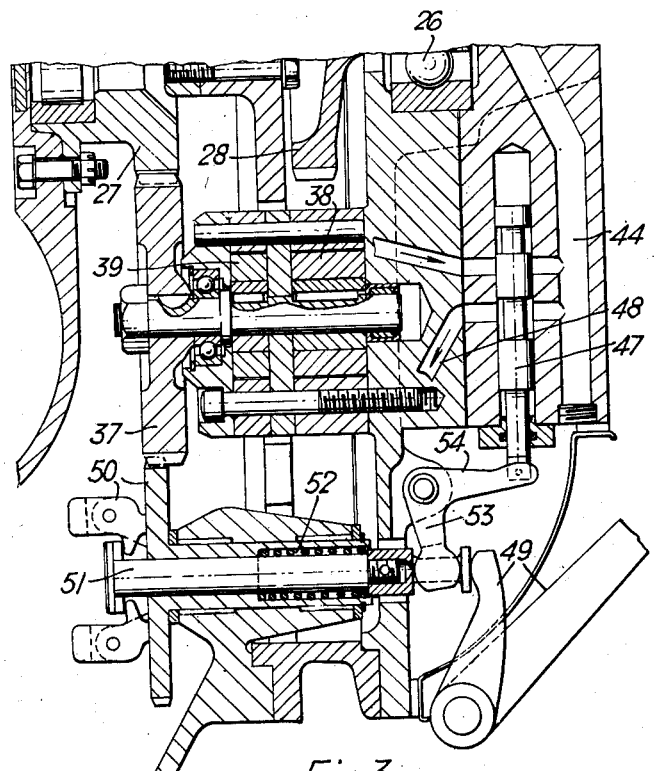
FIGURE 3 is a similar view to FIGURE 2 showing a valve controlled by a speed governor and which controls the flow of liquid to the clutch together with an overriding hand control.

In the alternative arrangement shown in FIGURE 3 a speed governor 50 is shown driven from the gear wheel 37 which drives the pump, the speed governor embodies an axially moving spindle 51 controlled by a spring 52 and which spindle engages one arm 53 of a pivoted bell crank lever the other arm 54 of which engages the stem of the valve 47.

The action of the governor may be overridden by a pivoted hand control 49 having a part which engages the end of the spindle 51.

Figure 1B:
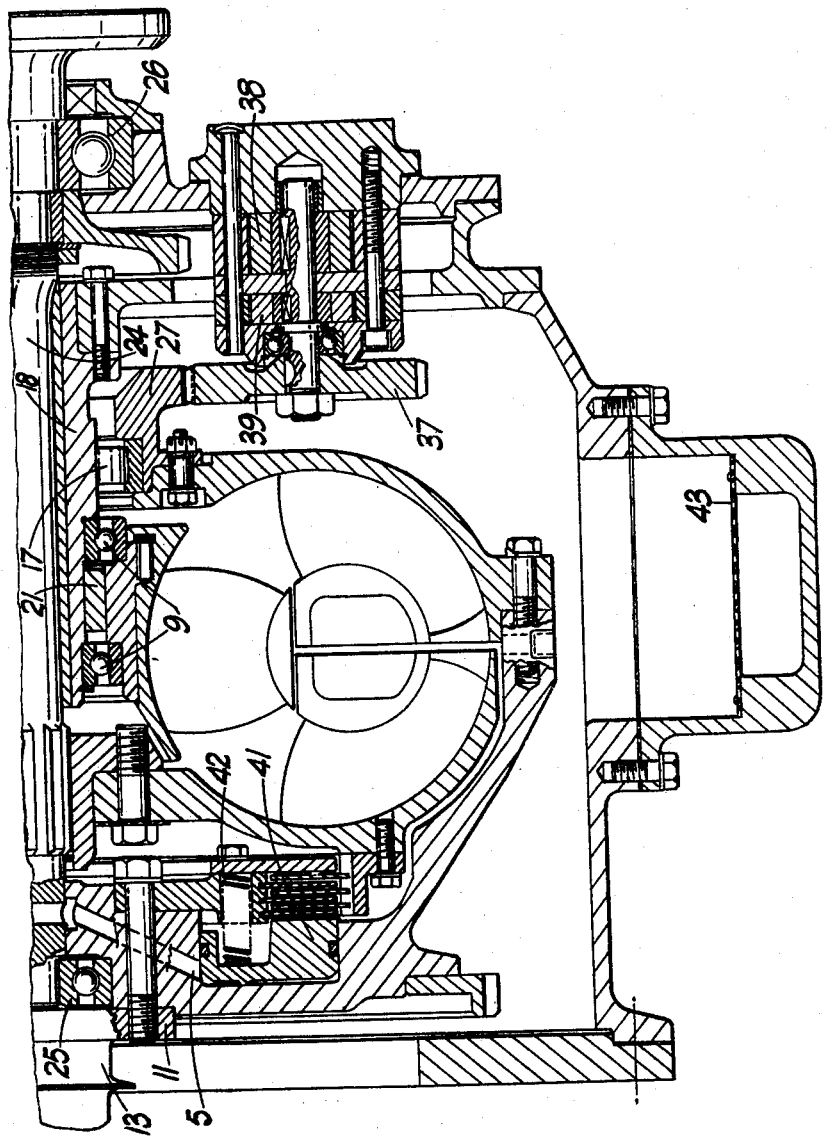
Figure 4:
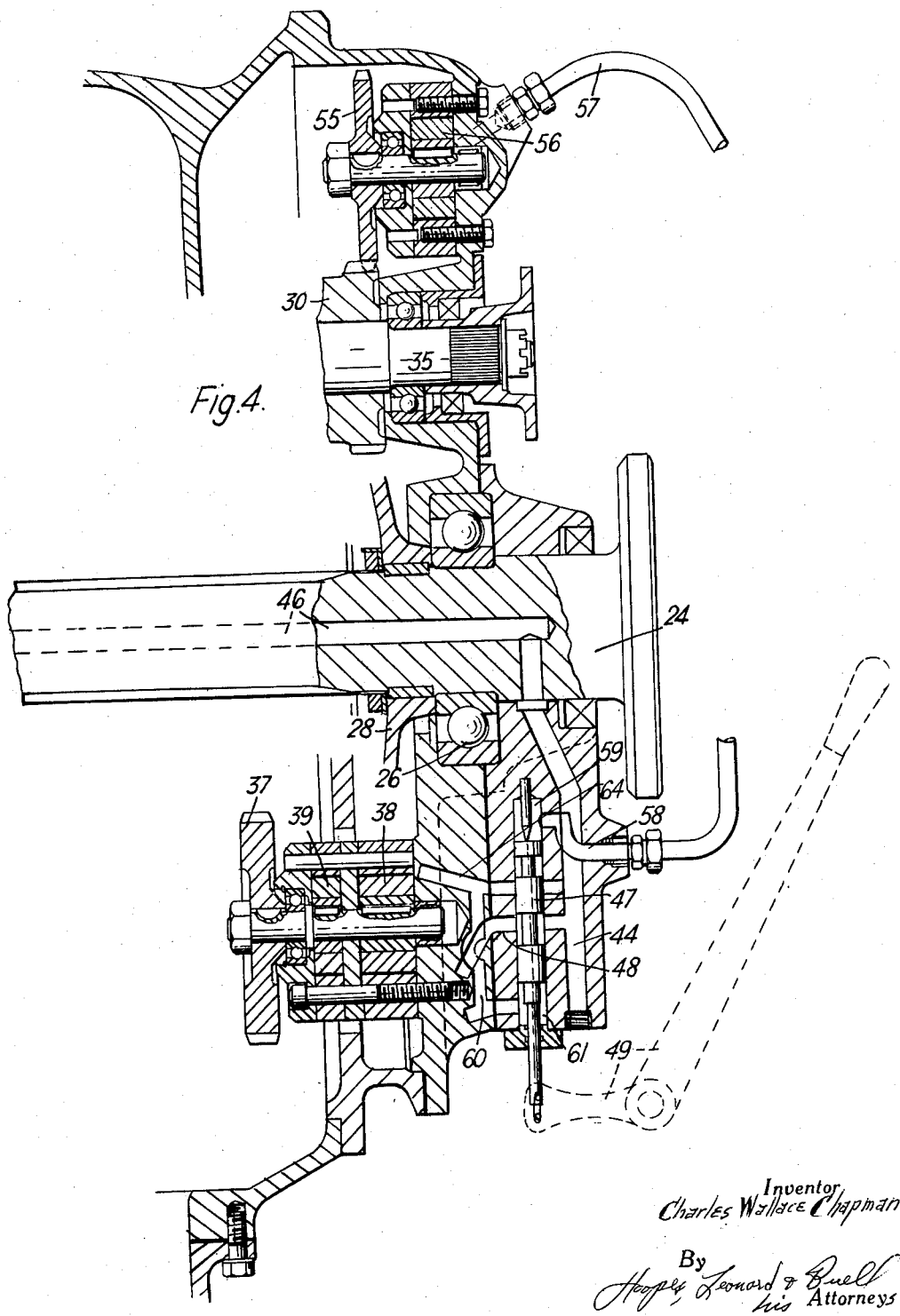
FIGURE 4 is a similar view to FIGURE 2 showing a valve controlling the flow of liquid to the clutch and operated in accordance with means sensitive to changes in torque.

In the arrangement shown in FIGURE 4 the gear wheel 30 which drives the ring gear 7 of FIGURE 1 is also arranged to engage a further gear wheel 55 which in its turn drives another pump 56. The delivery pipe 57 of that pump communicates with a passage 58 leading to the upper end of the bore 59 in which the control valve 47 is located. A by-pass passage 60 leads from the bottom portion 61 of said valve bore to the outlet passage 64 from the pump 39. When there is a high torque multiplication in the converter the pump 39 driven by the input side of the converter is rotating faster than the pump 56 which is driven by the output side. By suitably proportioning the pumps 39 and 56 the orifices of their discharge side the pressure difference between the two pump outlets thus applied to the top or bottom of the valve 47 can be predetermined at any given relative speed of the pumps, i.e. at any given relative speed of the input and output side of the converter, thus it can be arranged that until the speed differences across the converter fall to a predetermined figure the pressure on the bottom of the valve exceeds that on the top and the valve is held up and the clutch is free. When the speed difference falls below this figure the pressure from the pump 56 exceeds that of the pump 39 so forcing the valve down and engaging the clutch. Since the torque multiplication is a function of the speed difference across the converter and this speed difference is controlled by the torque requirement of the output shaft the control of the valve 47 is sensitive to torque. As in the previous construction an overriding hand control lever 49 may be provided.

Figure 5:
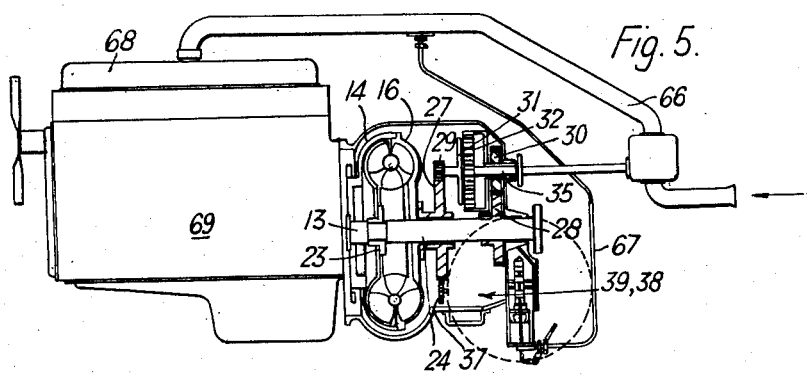
FIGURE 5 shows an arrangement of a valve controlling the flow of liquid to the clutch and operated by means responsive to changes in boost pressure.
Figure 6:
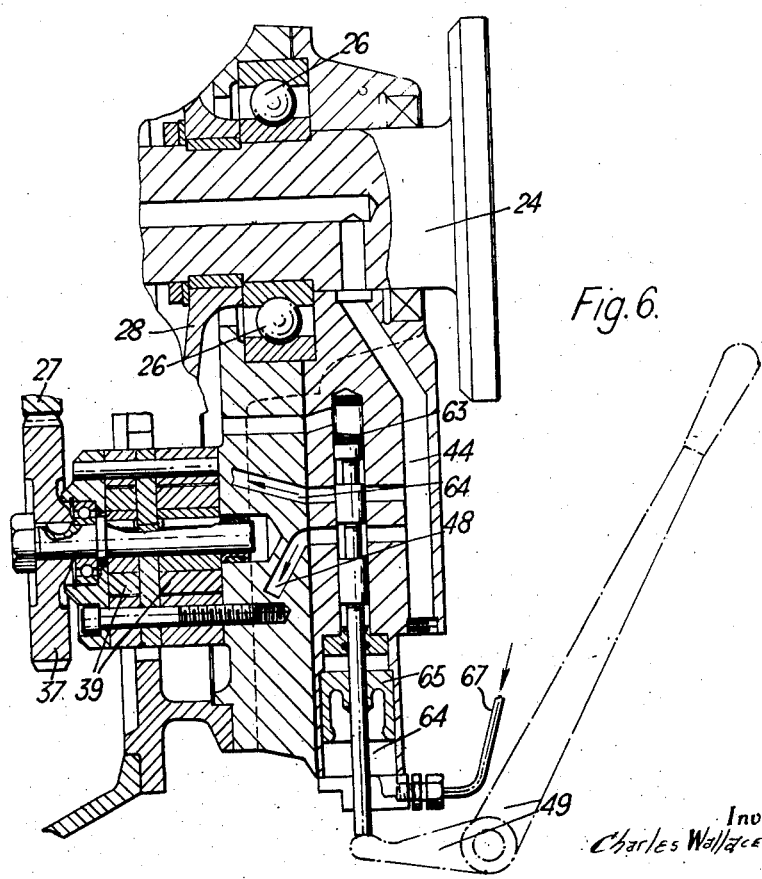
FIGURE 6 is an enlarged view of the valve.

In the arrangement shown in FIGURES 5 and 6 the valve 47 is actuated by means responsive to boost pressure. For this purpose the top of the valve is actuated upon by a compression spring 63 whereas the bore for the valve at the lower end is enlarged at 64 and contains a piston 65 which is subjected to the pressure in a pipe 67 leading from the outlet of the booster 70 to the induction pipe 68 of the engine 69. Thus under high boost the piston 65 forces the valve 47 upwardly against the action of the spring 63 thus moving the valve into a position in which the aforesaid clutch is disengaged. At a predetermined lower boost the spring 63 forces the valve 47 down so putting the valve into a position which engages the clutch.

Basically with this general system, boost pressure at full throttle falls with increase of driven shaft speed so that the clutch can be arranged to lock up under boost control at a pre-determined boost pressure or, under full throttle, at a pre-determined output shaft speed.

When the engine is at rest the valve 47 will be down and if on starting oil pressure builds up faster than boost pressure, as it would under idling conditions, the clutch will lock up which is undesirable at low speeds. Also, under normal operation, the clutch having locked as the boost falls, there may be no appreciable increase in boost to unlock the clutch as output shaft speed falls so that the clutch may remain locked. To overcome these disadvantages a hand lever 49 may be provided to enable the operator to lift the valve 47 and unlock the clutch at starting or at any time in service.

Figure 7:
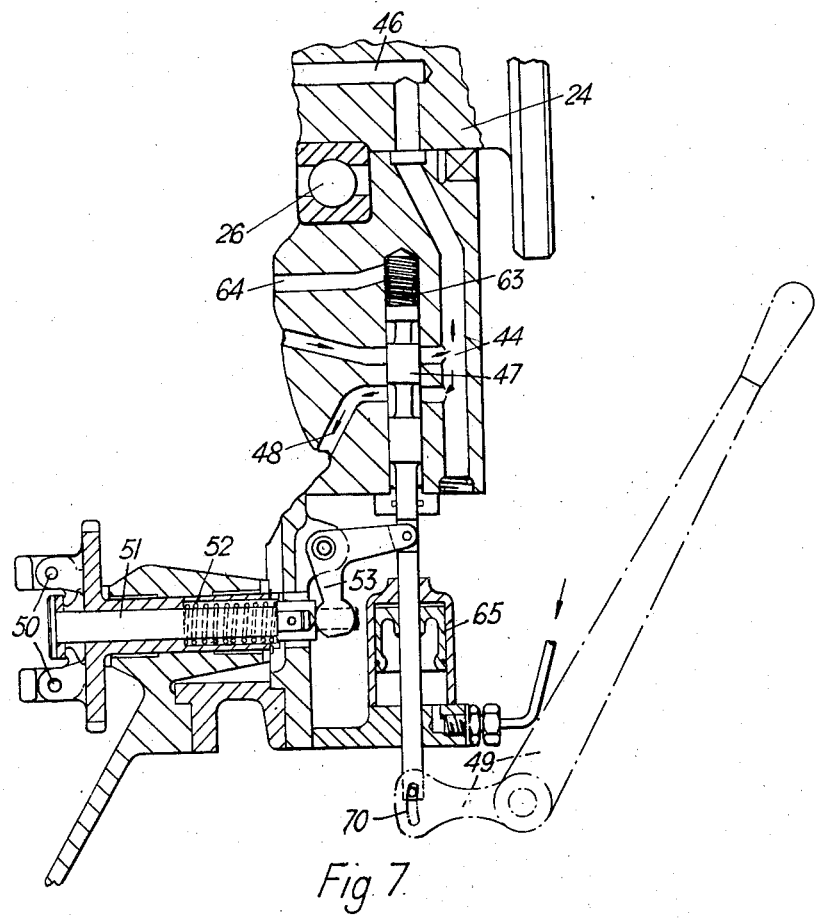
FIGURE 7 is a similar view to FIGURE 2 showing a valve controlling the flow of liquid to the clutch and operated jointly by means responsive to boost pressure and means responsive to changes in speed.

The arrangement shown in FIGURE 7 provides for a combined control of the valve 47 by boost pressure and speed for which purpose as in FIGURE 3 a governor 50, 51 and 52 is provided which actuates the valve 47 through a bell crank lever 53 and in addition the valve spindle has attached to it a piston 65 as in FIGURE 6 and a spring 63 bears on the top of the valve. In this arrangement the governor can lift the valve 47 to free the clutch but it cannot of itself lower the valve 47 to lock the clutch. The spring 52 is more powerful than the spring 63 so that when the engine is at rest valve 47 is up and the clutch free. At any speed above that at which the governor overcomes the spring 52, the valve 47 may still be held up by the boost pressure on the piston. When this falls sufficiently it allows spring 63 to depress valve 47 so lock the clutch. When the speed falls, even though the boost pressure is still low, spring 52 can at a pre-determined engine speed overcome the governor and spring 63 and lift valve 47 so freeing the clutch and allowing the converter to operate and to speed up the supercharger relative to the engine. This automatically overcomes the disadvantages of the previous arrangement and also allows the clutch to be automatically disengaged at a lower speed than that at which it is engaged, so that full advantage of the boost and torque conversion can be taken for acceleration, but the locked up economy can be maintained down to lower speeds. If desired a hand lever 49 can override both the governor and the boost control.

In this arrangement the hand control lever 49 actuates the valve 47 through a lost motion connection 70.

If the output shaft 24 of the converter is held stationary as for example by the application of the vehicle brakes and if the engine of the vehicle is started and allowed to idle, the vehicle will not move although there will be some torque on the transmission. The ring gear 7 of the epicyclic gear will be stationary, but the planet carrier 31 will rotate and drive the sun-gear 36 and so the supercharger. If the ratio of the speed of rotation of the planet carrier 31 to that of the sun-gear 36 in such circumstances be say 4 to 1, and if the engine rotates at $n$ r.p.m. then the supercharger speed will be 4 $nx$, where $x$ is a constant depending on the supercharger drive arrangement apart from the epicyclic gear.

To start the vehicle (say a full throttle start on a hill for maximum acceleration), the brakes would be released and the throttle opened. The engine would speed-up and if the vehicle did not start the supercharger speed would increase to increase the pressure in the engine induction system and hence to increase the engine torque. As previously mentioned the characteristics of the torque converter, the engine and the supercharger are preferably matched so that at a given speed (for example 1200 r.p.m.) in the lower speed range of the engine, the supercharger absorbs all the engine power, the maximum speed of both being thus limited; the output shaft of the torque converter will provide the necessary increased reaction torque and hence an increase output torque. It will be clear that as the difference in speeds of the input and output shafts of the torque converter decreases for a given engine speed, the supercharger speed will be reduced until a stage is reached at which the speeds of the two shafts are substantially the same, when the supercharger speed will become substantially directly related to the speed of the engine. Conversely when the load on the engine increases and the speed of the output shaft of the torque converter falls relatively to that of its input shaft (i.e. of the engine), the supercharger speed and hence its boost pressure will increase proportionately to the difference of speeds of the said input and output shafts becoming a maximum at conditions of vehicle stall.

The torque thus automatically adjusts itself to vehicle speed.

It will be appreciated, however, that the gear ratios between engine and the planet carrier 31 and between converter output shaft and the ring gear 7 may be chosen to give any desired characteristics.

The characteristics of the arrangement may, if desired, be such that the supercharger provides only atmospheric pressure in the engine induction system at the highest engine speeds, but any other desired degree of supercharge may be obtained by appropriate selection of the supercharge gear ratios etc.

A simple forward and reverse gearbox may be provided but there is no necessity for a clutch. Means, however, may be provided to clutch together the input and output shafts of the converter in the higher speed ranges.

I claim:
1. A variable speed power transmission comprising a torque converter, in the latter a pumping unit forming an input member for connection with a shaft driven from a power unit, and a turbine runner forming an output member connected to an output shaft for connection with the shaft of an apparatus to be driven, a booster for the power unit, a driven shaft for the booster, a differential gear, first and second input elements in the latter, driving connections between the input and output members of the torque converter and the respective input elements, and an output element connected to the booster driving shaft; in which the output shaft and booster driving shaft are parallel to each other, the driving connection between the input member and the first input element comprises, adjacent one end of the torque converter, a gear wheel fixed to the pumping unit concentrically with the output shaft and meshing with a first gear wheel freely mounted on the booster driving shaft, the driving connection between the output member and the second input element comprises, adjacent the same end of the converter, a gear wheel fixed to the output shaft meshing with a second gear wheel freely mounted on the booster driving shaft, and said differential gear wheel is an epicyclic gear of which the first input element is a planet wheel carrier fixed to said first gear wheel, the second input element is an internally toothed ring fixed to said second gear wheel, and the output member is a sun wheel.

2. In a variable speed transmission as claimed in claim 1 a clutch arranged between the input and output members of the torque converter and hydraulically operated by liquid supplied to the converter and a hand operated valve by which the liquid is controlled.

3. In a variable speed transmission as claimed in claim 1 a clutch arranged between the input and output members of the torque converter and hydraulically operated by liquid supplied to the converter, and a valve operated by means sensitive to changes of speed by which the liquid is controlled.

4. In a variable speed transmission as claimed in claim 1 a clutch arranged between the input and output members of the torque converter and hydraulically operated by liquid supplied to the converter, and a valve operated by means responsive to changes in torque by which the liquid is controlled.

5. In a variable speed transmission as claimed in claim 1 a clutch arranged between the input and output members of the torque converter and hydraulically operated by liquid supplied to the converter, and a valve operated by a device responsive to the pressure generated by the booster by which the liquid is controlled.

6. In a variable speed transmission as claimed in claim 1 a clutch arranged between the input and output members of the torque converter and hydraulically operated by liquid supplied to the converter, and a liquid control valve operated by means responsive to changes in the operating conditions of the transmission, and an overriding hand control for said valve.

7. A variable speed power transmission as claimed in claim 1, in which the booster is of the exhaust turbo-blower type.

8. A variable speed power transmission as claimed in claim 1, in which said gear wheel fixed to the pumping unit supports the latter relative to the output shaft by means of a rolling bearing on a stationary stub shaft member through which said output shaft passes.

9. In a variable speed power transmission as claimed in claim 1, a feed pump for the converter, a driving shaft in said feed pump, and a gear wheel fixed to said shaft and meshing with the gear wheel fixed to the pumping unit forming the input member so that the feed pump is driven by the latter.

References Cited in the file of this patent
UNITED STATES PATENTS

| | | |
|---|---|---|
| 2,091,356 | Fawcett | Aug. 31, 1937 |
| 2,128,413 | Hejduk et al. | Aug. 30, 1938 |
| 2,292,482 | Roche | Aug. 11, 1942 |
| 2,368,684 | Simpson | Feb. 6, 1945 |
| 2,467,077 | Brunken | Apr. 12, 1949 |
| 2,497,338 | Baron | Feb. 14, 1950 |
| 2,499,128 | Brunken | Feb. 28, 1950 |
| 2,505,713 | Lucia | Apr. 25, 1950 |
| 2,588,220 | Duffield | Mar. 4, 1952 |
| 2,707,408 | Ahlen | May 3, 1955 |
| 2,884,806 | Tuck | May 5, 1959 |
| 2,959,070 | Flinn | Nov. 8, 1960 |